Sept. 20, 1966 O. WOLF ETAL 3,273,309

APPARATUS FOR FILLING AND SEALING TWO-PIECE CAPSULES AND THE LIKE

Filed Oct. 1, 1962 2 Sheets-Sheet 1

INVENTORS

Otto Wolf

Theo Moser

BY

Michael S. Striker

ATTORNEY

INVENTORS
Otto Wolf
Theo Moser

BY

Michael S. Striker
ATTORNEY

United States Patent Office 3,273,309
Patented Sept. 20, 1966

3,273,309

APPARATUS FOR FILLING AND SEALING TWO-PIECE CAPSULES AND THE LIKE

Otto Wolf, Kirchheim, Teck, and Theo Moser, Waiblingen, Wurttemberg, Germany, assignors to Höfliger & Karg, Waiblingen, Germany, a firm of Germany Filed Oct. 1, 1962, Ser. No. 227,479
Claims priority, application Germany, Jan. 5, 1962, H 44,537; Jan. 22, 1962, H 44,680
6 Claims. (Cl. 53—281)

The present invention relates to improvements in an apparatus of the type as disclosed in the copending application of Otto Höflinger, Serial No. 848,962, filed on Oct. 27, 1959, now U.S. Patent No. 3,070,932, for continuously filling and sealing the cartridges of two-piece capsules or similar receptacles for freely flowing solid particles, such as powdery or granular materials.

In this prior apparatus, a pair of partially overlapping disks are intermittently rotated in the same direction and both disks are provided with an equal number of apertures for receiving the upper and lower parts of the capsules. These apertures in each disk are arranged in equal groups within which they are equally spaced from each other, and the corresponding apertures of each group are disposed at equal distances from the axis of rotation of the respective disk. During short stops of the rotating disks the apertures of two groups of one disk are to be brought simultaneously into vertical alignment with a corresponding number of apertures of two other groups of the other disk. For attaining this object, the previous invention provides that the apertures of each group of one disk are disposed within a radius of the latter, while the apertures of each group of the other disk are disposed within a straight line which extends at right angles to a radius of this disk which intersects with a central point of the respective group. Thus, if connecting lines are drawn on the latter disk between the centers of the two outer apertures of each group and the axis of rotation of the disk, a number of equal central angles is formed which equals the number of groups of apertures in this disk. The central angles are then of a size which depends upon the number of apertures which are provided in each group. Since the individual apertures of each group have to be spaced at a certain minimum distance from each other, which is required especially by the feeding means for the capsules, the number of apertures of each group in a disk of a certain diameter and thus also the maximum output of the machine is limited by the number of steps or stops which the disks have to make during each revolution.

It is the principal object of the present invention to increase the output of the mentioned machine considerably over the output which has so far been attainable without changing the mechanical structure and functions of the machine itself or the speed of rotation of the disks.

According to the invention it has been found that this object may be attained by providing the disks with very particular group arrangements of apertures which permit the number of apertures which may be provided in each disk within a sector of a certain size to be considerably increased over the arrangement as described in the mentioned prior application in which the apertures of each group in one disk are provided on a radius thereof, while each aperture group in the other disk is arranged on a straight line of a certain length which extends at right angles to a radius of the disk which passes through the center of the group.

Another object of the present invention consists in providing the two disks with groups of apertures in such an arrangement as to permit different materials and/or capsules of different sizes to be filled simultaneously in different apertures of each group or in different groups of apertures.

For attaining especially the first of the two abovementioned objects, the invention consists in providing each disk with a plurality of apertures which again are arranged in groups which are equally spaced from each other in the peripheral direction of the disk and wherein the apertures of each group lie within a straight line or a plurality of intersecting straight lines, and the center of each group or the point of intersection of the different straight lines of each group lies within a circle which is concentric to the axis of rotation of the respective disk and intersects the corresponding circle of the other disk at right angles at two different points. Furthermore, the corresponding straight lines defined by the apertures of all groups, the central points of which are disposed at the same distance from the center of the respective disk, extend at the same angle to the radii of the disk which pass through the central points of the respective groups. According to the present invention, this angle may be of any desired size in each disk and preferably amounts to either more or less than 90°, provided that this angle differs in one disk by 90° from the respective angle in the other disk and that at one stop of each group during the revolution of both disks the apertures of at least two peripherally spaced groups of one disk are in vertical alignment with at least two spaced groups of the other disk so as to form at least two stations in the operation of the machine.

Another feature of the invention for attaining the aforementioned objects consists in arranging the groups of apertures in each disk so that the central points of different groups or of groups of different series are located on at least two circles of different diameters which extend concentrically to the axis of rotation of the respective disk. The associated circles on the two disks again intersect at two points or stations at right angles. The angle which is enclosed by the two radii which extend from the center of each disk through the two points of intersection of the associated circles should form a multiple of the size of the desired angle of each step of the intermittent revolution of each disk.

The present invention will become more clearly apparent from the following detailed description of several preferred embodiments thereof when read in connection with the accompanying drawings, in which:

FIGURE 3 shows a similar plan view of a modification of the invention with an arrangement of a larger number of apertures in each group; while FIGURE 4 shows a similar plan view of a further modification of the invention with an arrangement of the apertures in rectilinear groups which are disposed at different angles and at different radial distances in each disk.

Figure 1:
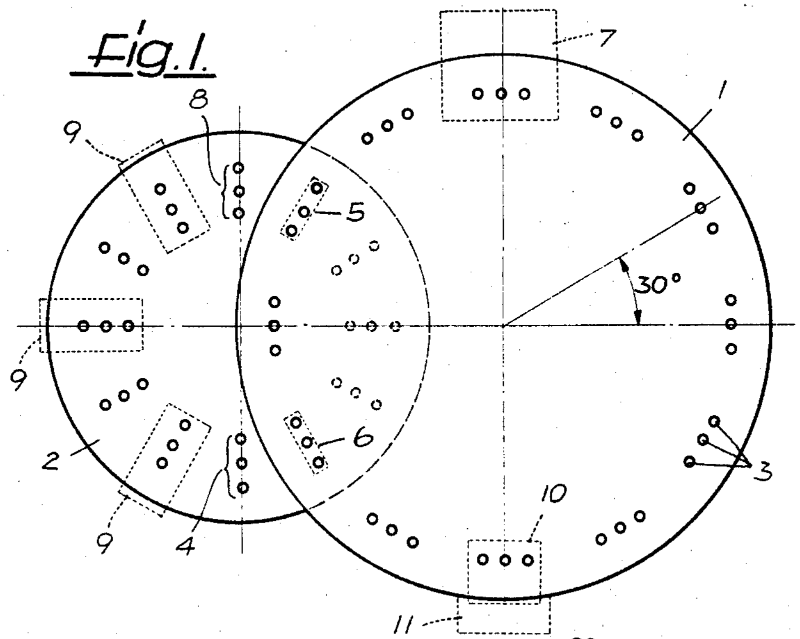
FIGURE 1 shows for the purpose of comparison a plan view of the two disks of the machine with the arrangement of the groups of apertures as described and claimed in the mentioned copending application, Serial No. 848,962, now Patent No. 3,070,932.

In the drawings, FIGURE 1 shows the arrangement of apertures in the two intermittently rotating disks of the capsule filling machine as described in detail in the mentioned copending application, Serial No. 848,962, now Patent No. 3,070,932. The disk 1 partly overlaps the disk 2 and contains a plurality of peripherally spaced groups of cylindrical apertures 3 which extend axially through the disk. Each group contains three of these apertures which are disposed within a straight line which extends at right angles to a radius of disk 1 which is drawn through the central point of each group, i.e. the central point of the central aperture of the respective group.

The partly overlapped disk 2 contains the same number of groups of apertures 4 as disk 1, but all three apertures 4 of each group lie on a radius of disk 2 in a position so that at each stop in the intermittent rotation of both disks the apertures 3 and 4 of one group of each disk are in vertical alignment with each other at the station 5 and those of a second group of each disk at the station 6.

The operation of the machine is briefly as follows: During the intermittent rotation of disks 1 and 2 in the same direction, the two-part capsules which are inserted in a closed condition into the apertures 3 of disk 1 by a dispensing device 7 are acted upon by suction at the station 5 whereby the lower cartridge parts of the capsules are separated from their caps and are drawn into the apertures 4 in the lower disk 2, while the caps remain in the apertures 3 of the upper disk 1 by engaging with their lower ends against a shoulder on the wall of each aperture 3.

The lower cartridge parts in disk 2 are then passed at first to a control station 8 in which each aperture 4 of the particular group is checked that it contains a cartridge, and thereafter they are passed successively to several filling stations 9. During the following steps in the intermittent rotation of the disks, the filled cartridges are passed to the station 6 in which the two groups of apertures in the upper and lower disks are again in vertical alignment with each other and the filled cartridges are pushed upwardly out of the lower disk 2 and partly into the caps in the apertures 3 in the upper disk 1. Thereafter, the filled and closed capsules are moved by the upper disk 1 to a discharge station 10 where they are ejected from the apertures in disk 1 and into a conveyor or chute 11 which advances the finished capsules to a packaging or storing station.

The structure and operation of the machine according to the present invention is principally the same as above described, except that it permits a considerable increase in the rate of production of filled capsules without requiring either the speed of rotation of the two disks or the length of time of their stop at the various stations to be increased. Of course, since this increase in the rate of production is attained by providing a greater number of apertures in each group and thus a greater number of capsules which is to be processed at the different stations, the number of means for carrying out the respective operations at each station have to be accordingly increased. Since these means and stations are also principally the same according to the invention as those indicated in FIGURE 1, they are also identified in FIGURES 2 and 3 by the same reference numerals as in FIGURE 1.

Figure 2:
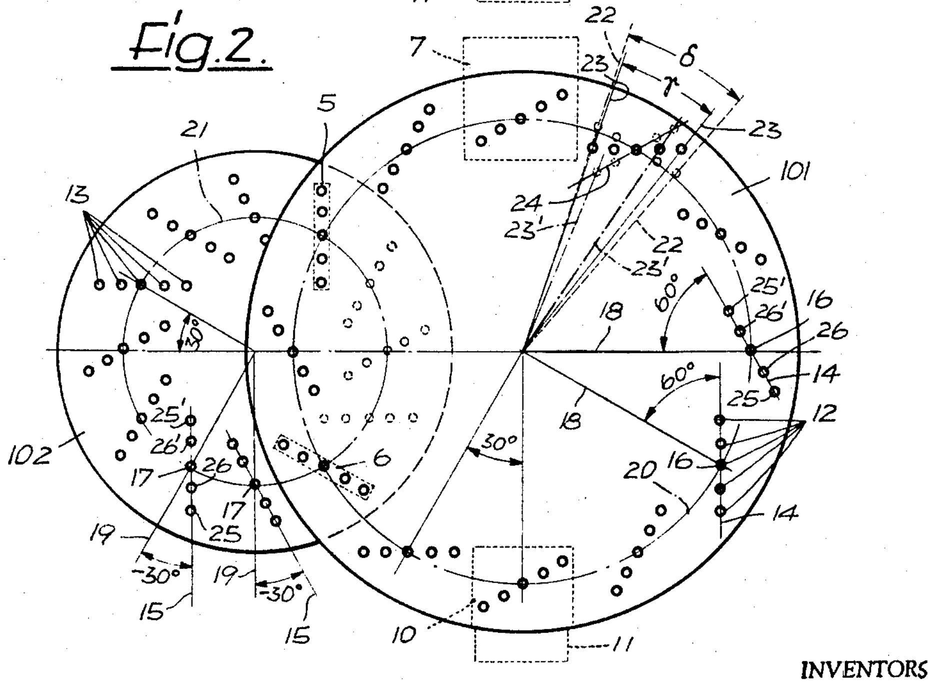
FIGURE 2 shows a similar plan view of one embodiment of the present invention with an arrangement of apertures on straight lines extending at angles of more or less than 90° to the radii of the disks passing through the central points of the different groups.

According to the first embodiment of the invention and as illustrated in FIGURE 2, the increase in the rate of production is attained by providing the upper and lower disks 101 and 102 with an equal number of groups of apertures 12 and 13 as are provided in the disks according to FIGURE 1 but with a larger number of apertures in each group. The apertures 12 and 13 of each group again lie within a straight line 14 or 15, respectively, which in this case, however, is turned about its central point 16 or 17, respectively, so that each line 14 containing one group of apertures 12 in the upper disk 101 extends at an angle of 60° to the radius 18 of the disk passing through the central point 16, while each line 15 containing one group of apertures 13 in the lower disk 2 extends at an angle of −30° to the radius 19 of the disk passing through the central point 17. Each aperture 25 or 26 of each group which is located on a straight line 14 or 15 at a certain distance from and at one side of the central point 16 or 17 of this group is associated with an aperture 25′ or 26′ on the same straight line at the other side of the central point 16 or 17 and at the same distance from the central point on which another aperture is located. Therefore, all apertures on each straight line 14 or 15 are arranged symmetrically to the central point 16 or 17 of the respective group. Since each disk contains twelve groups of apertures, the radii 18 and 19 passing through the central points 16 or 17 of adjacent groups always enclose an angle of 30°. The two circles 20 and 21 shown in dash lines intersect at right angles at station 5 where the two parts of the capsules are separated, as well as at station 6 where the capsules are again closed. When the two disks are in a position in which two radii 18 and 19 are directly superimposed on each other, it will be seen that the two respective lines 14 and 15 also extend at right angles to each other.

In FIGURE 2, the dash lines 22 define a sector which is limited by the radii which intersect the outermost apertures of one group which are located on a straight line extending at right angles to the radius passing through the central point of this group. When comparing this sector between the lines or radii 22 with the sector which is defined by the corresponding radii as shown by the full lines 23 which intersect the group of apertures 12 which is inclined at an angle of 60° to the radius passing through the central point of this group, it will be seen that the angle $\delta$ between the lines 22 is larger than the angle $\gamma$ between the lines 23. Consequently, when a rectilinear group of apertures 12 of a certain length and containing a certain number of apertures at a certain distance from each other is inclined at an angle of 60° to a radius 18 which intersects the central point 16, it will be confined within a smaller sector of the circle 20 than when it extends at right angles to this radius. If the straight line on which an aperture group is located is still further inclined, as shown at 24, it would require a still smaller sector of the circle, as indicated in dot-and-dash lines 23′. Therefore, a larger number of equally spaced apertures could be provided between the radii 22 on an inclined straight line than on a straight line which is perpendicular to the radius intersecting the central point of the respective aperture group. It is thus evident that, even though the rate of speed of the disks, the number and length of stops at the different stations, and the distance between the adjacent apertures in each rectilinear group are not changed, it is possible to increase the output of the machine considerably if the straight lines formed by the groups of apertures are disposed at an angle of less than 90° to the radius of the disk extending through the center of one of the groups.

Figures 3, 4:
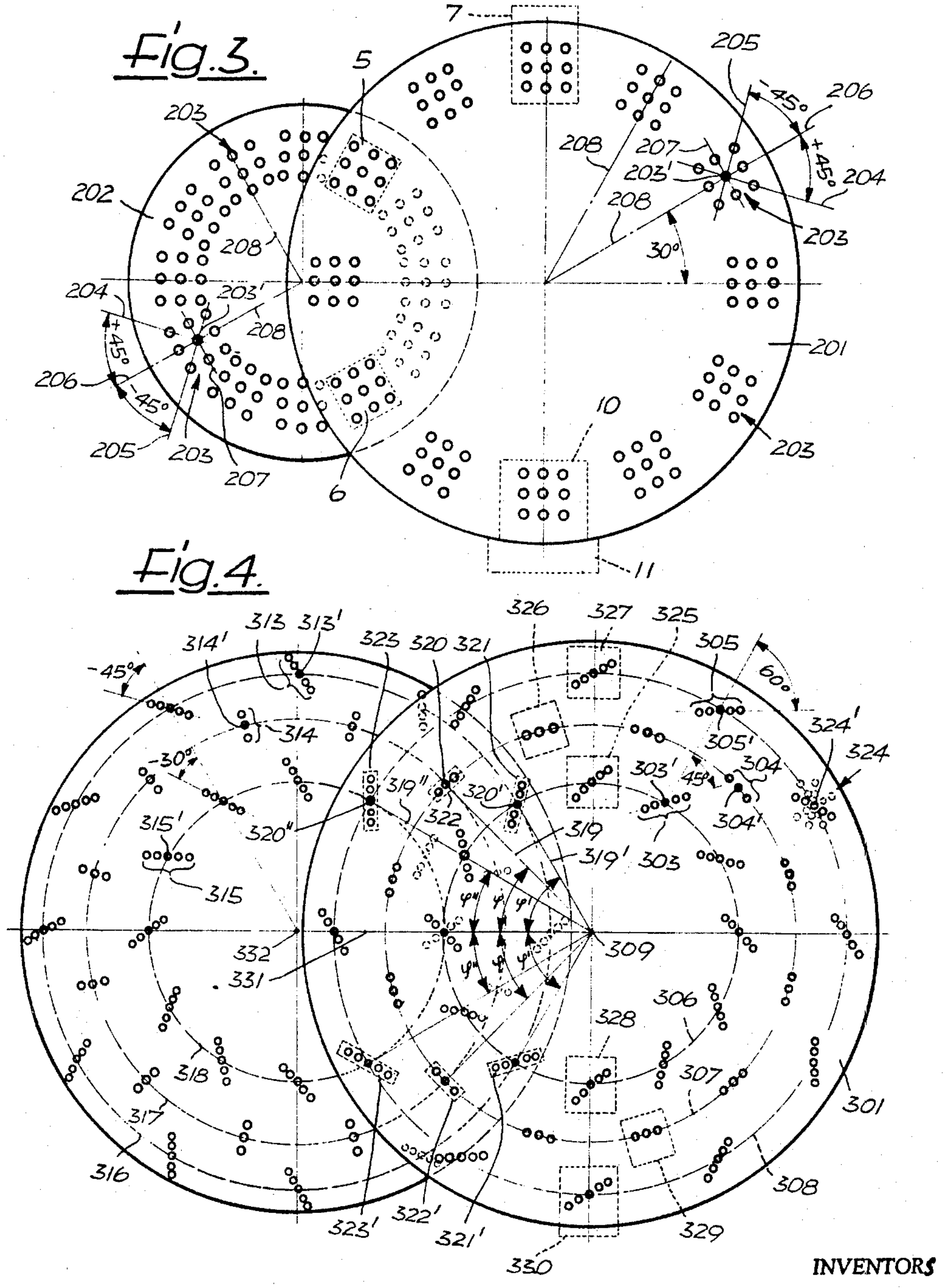

The rate of production of the machine, that is, the output in filled capsules, may be further increased by arranging the apertures in groups of a design as illustrated in FIGURE 3, in which disks 201 and 202 are provided with a series of aperture groups 203. Each of these groups 203 has a central point 203′. The apertures of each group lie within several straight lines 204, 205, 206, and 207 which intersect with the central point 203′ and extend, for example, at an angle of +45°, −45°, 0°, and 90°, respectively, relative to the radius 208 which intersects the central point 203′. Of course, the number of apertures in each group may be further increased by drawing further straight lines containing additional apertures at other angles through the central point. It is also by no means necessary that the aperture groups have a rectangular shape, as illustrated in FIGURE 3, but only that the condition is fulfilled which is described in detail with reference to FIGURE 2, namely, that all apertures on each straight line are arranged symmetrically to their central point.

FIGURE 4 illustrates another modification of the invention, in which disk 301 is provided with three series of aperture groups 303, 304, and 305, the centers 303′, 304′, and 305′, respectively, of which are equally distributed on three circles 306, 307, and 308, respectively, which are concentric to the axis of rotation 309 of disk 301 and the diameters of which differ from each other.

Disk 302 is likewise provided with three series of aperture groups 313, 314, and 315, the respective centers 313', 314', and 315' of which lie on three circles 316, 317, and 318, respectively. The radius 319 of disk 301 which passes through the point 320 of intersection of the two circles 307 and 317 extends at an angle $\varphi$ of 45° to the straight line 331 which interconnects the axes 309 and 332 of both disks. This angle $\varphi$ in this embodiment of the invention forms an integral fraction of 360°. The same applies to the angles $\varphi'$ of 60° and $\varphi''$ of 30° which are enclosed by line 331 and the radii 319' and 319'' passing through the point of intersection 320' of the two circles 306 and 316 and through the point of intersection 320'' of the two circles 308 and 318, respectively.

If each step in the intermittent rotation of both disks amounts to a turn of, for example, 30° about their axes, as indicated in FIGURE 4, each disk carries out twelve steps during each revolution. Consequently, the angles $2\varphi$, $2\varphi'$, and $2\varphi''$ must each be of a size which is a multiple of the size of the angle of each step. As the angle $2\varphi$ amounts to 90°, the angle $2\varphi'$ amounts to 120° and the angle $2\varphi''$ amounts to 60°. Consequently, all three angles are multiples of the angle of 30° of each step.

The various aperture groups of each series of one disk may be disposed on straight lines which extend at any desired angle to the respective radius intersecting the respective central point 303', 304', 305', 313', 314', 315'. Thus, for example, while the straight lines of the groups 304 of apertures on the circle 307 are centrally intersected at right angles by the radii of disk 301 similarly as in FIGURE 1, the aperture groups 305 on the circle 308 are disposed on straight lines which are inclined at an angle of 60° relative to the respective radii, and the aperture groups 303 on the circle 306 are inclined at an angle of 45° relative to the respective radii. Each of the aperture groups 313, 314, and 315 of disk 302 which are associated with the aperture groups 303, 304, and 305, respectively, of disk 301 are in vertical alignment with the latter at the stations 321, 321' and 322, 322' and 323, 323', respectively. The straight lines on which the apertures of the groups of disk 302 are located are inclined at an angle to the radii intersecting the central points of the respective groups which extend at right angles to the position of the associated straight lines of aperture groups on disk 301. Thus, the aperture groups 314 of disk 302 lie as in FIGURE 1 on the radii of the disk, while groups 313 are inclined at an angle of −45° and groups 315 at an angle of −30° to the respective radii.

Similarly as described with reference to FIGURE 3, it is also possible in the embodiment of the invention according to FIGURE 4 to increase the rate of production of filled and sealed capsules to a still greater extent by arranging the apertures of each group on at least one of the circles 306, 307, and 308 on a plurality of straight lines, as indicated in dotted lines at 324. The distances of the outermost apertures on all lines may be of equal or different length as long as the apertures on each straight line are disposed symmetrically to the central point 324'.

The various stations for the three aperture groups of each disk may be either combined with each other or form separate units. Thus, as diagrammatically indicated in FIGURE 4, the capsule dispensing station (corresponding to the station 7 in FIGURES 1 to 3) which is provided for the aperture group 303 is indicated at 325, for the aperture group 304 at 326, and for the aperture group 305 at 327. The filling stations corresponding to the station 9 in FIGURES 1 to 3 are omitted in FIGURE 4 as they would render the illustration unclear. The discharge stations where the finished capsules are ejected from the machine are indicated at 328, 329, and 330.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In an apparatus for filling and sealing two-part capsules, in combination, a pair of disks mounted for intermittent rotary movements at a certain step angle about spaced parallel axes at such a distance from each other that a portion of one disk overlaps a portion of the other disk, both of said disks having a plurality of apertures arranged in a plurality of groups forming several series, the apertures in one of said disks being adapted to receive the upper parts of said capsules and the apertures in the other disk being adapted to receive the lower parts of said capsules, the overlapping portions of said disks defining two spaced transfer stations for each series, all apertures of one group of one series of one disk being simultaneously in alignment at said stations with all apertures of one group of one corresponding series of the other disk during the intervals between the intermittent movements of said disks, all apertures and a central point of each of said aperture groups in each disk being located on at least one straight line, said central points of said groups of each series being located on one circle and being equally spaced from each other, the circles of different series having different diameters and being concentric to the axis of the respective disk, said circle of each series of one disk intersecting at said transfer stations at right angles with the circle of the corresponding series of the other disk, each aperture at one side of said central point on each straight line being associated with a corresponding aperture at the other side of and equally spaced from said central point, said straight lines of the aperture groups of at least some series of each disk forming equal angles other than 90° to the radii of the respective disk intersecting said central points, said angles of said straight lines of each group of each series of one disk differing by 90° from said angles of said straight lines of the groups of the corresponding series of the other disk, the size of the angle between two radii of each disk intersecting said central points of each pair of adjacent aperture groups of each series of each disk, and the size of the angle between two radii of each disk intersecting said centers of said two transfer stations of each of said series, as well as the size of the angle of one complete revolution of each disk when divided by the size of the step angle of the respective disk resulting in integral numbers.

2. In an apparatus for filling and sealing two-part capsules, in combination, a pair of disks mounted for intermittent rotary movements at a certain step angle about spaced parallel axes at such a distance from each other that a portion of one disk overlaps a portion of the other disk, both of said disks having a plurality of apertures arranged in a plurality of groups forming several series radially spaced from each other, the apertures in one of said disks being adapted to receive the upper parts of said capsules and the apertures in the other disk being adapted to receive the lower parts of said capsules, the overlapping portions of said disks defining two spaced transfer stations for each series, all apertures of one group of one series of one disk being simultaneously in alignment at said stations with all apertures of one group of one corresponding series of the other disk during the intervals between the intermittent movements of said disks, all apertures and a central point of each of said aperture groups in each disk being located on at least one straight line, said central points of said groups of each series being located on one circle and being equally spaced from each other, the circles of different series having different diameters and being concentric to the axis of the respective disk, each aperture at one side of said central point on each straight line being associated with a corresponding aperture at the other side of and equally spaced from said central point, said circle of each series of one disk intersecting at said transfer stations at right angles with the circle of the corresponding series of the other disk, said straight lines of the aperture groups of at least some series of each disk forming equal angles other than 90° to the radii of the respective disk intersecting said central points, said angles of said straight lines of each group of each series of one disk differing by 90° from said angles of said straight lines of the groups of the corresponding series of the other disk, the size of the angle between two radii of each disk intersecting said centers of said two transfer stations of each of said series when divided by the size of the step angle of the respective disk resulting in an integral number and the angle of one complete revolution of each disk when divided by the half of said angle, between two radii of each disk intersecting said centers of said two transfer stations of at least one of said series resulting in an integral number.

3. A combination as defined in claim 1, in which each disk is provided with three series of aperture groups.

4. A combination as defined in claim 1, in which the corresponding straight lines of at least two series of each disk extend at substantially the same angle to the radii intersecting the central points of the groups of said series.

5. A combination as defined in claim 1, in which the corresponding straight lines of said series of each disk extend at the same angle to the radii intersecting the central points of said groups, said straight lines of at least two of said series of each disk extending at different angles to said radii.

6. A combination as defined in claim 1, in which all apertures and the central point of each aperture group of at least one of said series are arranged on a plurality of straight lines, said lines intersecting at said central point.

References Cited by the Examiner

UNITED STATES PATENTS

| | | | |
|---|---|---|---|
| 2,412,637 | 12/1946 | Smith | 53—281 |
| 3,070,932 | 1/1963 | Hoflinger | 53—281 |
| 3,078,629 | 2/1963 | Besemer et al. | 53—282 XR |

FRANK E. BAILEY, *Primary Examiner.*

BROMLEY SEELEY, *Examiner.*

A. E. FOURNIER, R. L. FARRIS, *Assistant Examiners.*